C. M. JAMES.
APPARATUS FOR DISTILLING VOLATILE HYDROCARBONS OR OTHER SUBSTANCES.
No. 86,232.  Patented Jan. 26, 1869.
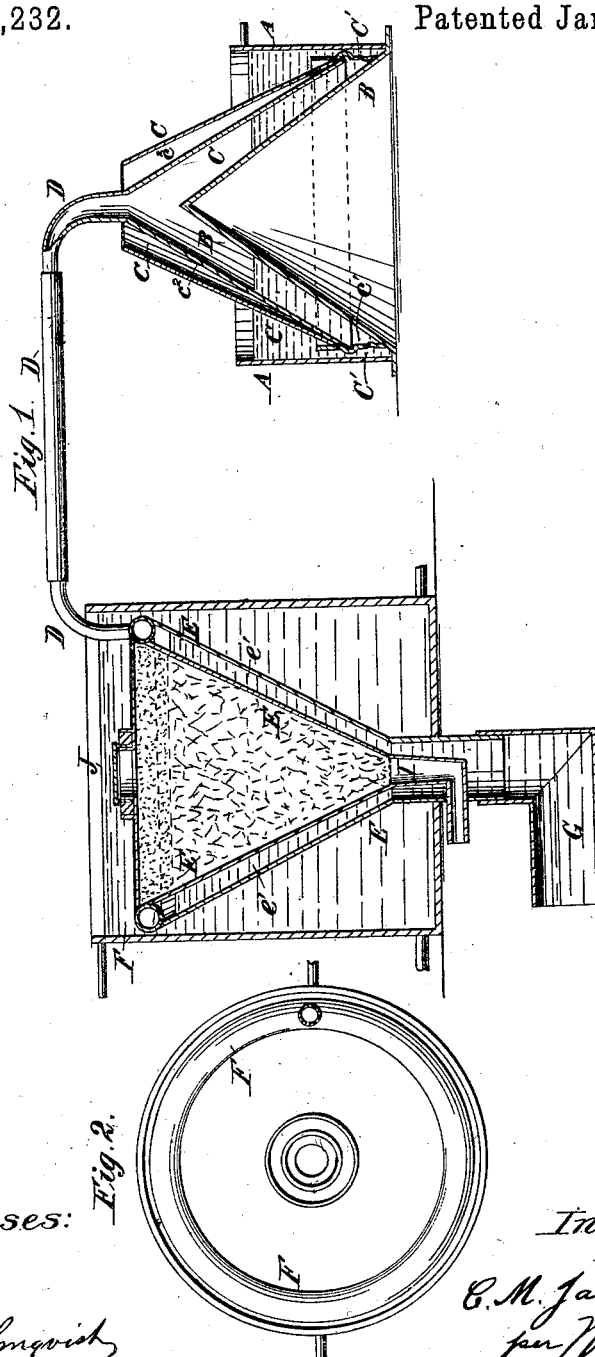
Witnesses:  
A. W. Almqvist  
G. C. Cotton
Inventor:  
C. M. James  
per Munn & Co  
Attorneys

United States Patent Office.

C. M. JAMES, OF NEW YORK, ASSIGNOR TO HIMSELF, A. T. SMITH, AND JOHN BUTLER, OF BROOKLYN, NEW YORK.

Letters Patent No. 86,232, dated January 26, 1869.

---

IMPROVED APPARATUS FOR DISTILLING VOLATILE HYDROCARBONS AND OTHER SUBSTANCES.

---

The Schedule referred to in these Letters Patent and making part of the same.

---

*To all whom it may concern:*

Be it known that I, C. M. JAMES, of the city, county, and State of New York, have invented a new and useful Improvement in Apparatus for Distilling Volatile Hydrocarbons; and I do hereby declare that the following is a full, clear, and exact description thereof, which will enable others skilled in the art to make and use the same, reference being had to the accompanying drawings, forming part of this specification.

Figure 1 is a vertical section of my improved apparatus.

Figure 2 is a top view of the condenser, the manhole plate being removed.

Similar letters of reference indicate corresponding parts.

My invention has for its object to furnish an improved apparatus designed especially for the distillation of volatile hydrocarbons, but equally applicable for other substances, by the use of which the desired distillation may be obtained, of a uniform density or gravity, in a continuous process, until the whole or nearly the whole of the substance being operated upon has been distilled; and It consists in the construction and combination of the various parts of the apparatus, as hereinafter more fully described.

A is the tank or receptacle, into which the substance to be distilled is placed.

The bottom, B, of the tank A, is made of copper, and in the shape of a cone, as shown in fig. 1. The heat is applied in the cavity of the cone B, by means of a coil of steam-pipe, a fire, or other well-known means.

If desired, the base of the cone may be closed, and a suitable liquid placed in the cavity of said cone, surrounding the coil of pipe.

C is a cone fitting over the cone B, so as to leave a thin space or chamber between the outer surface of the cone B and the inner surface of the cone C, for the reception of the liquid to be distilled, which is thus exposed to the heat in a thin sheet.

The lower edge of the cone C rests upon the bottom of the tank A, in such a way as not to obstruct the passage of the substance to be distilled into the space between the cone B and the cone C.

This may be done by attaching a downwardly-projecting flange, $c^1$, to the lower edges of the cone C, through holes in the lower part of which the substance to be distilled may pass freely.

The walls of the cone C are made double, to form an air-space or chamber, $c^2$, to prevent the radiation of the heat, and the consequent heating of the substance to be distilled, before it has entered the space between the cones B and C.

As the substance to be distilled is vaporized, the vapor passes through the pipe D to the condenser, which is made in the form of an inverted double-walled cone, E, having a narrow space, $e'$, between the said walls, as shown in fig. 1.

In the upper part of the space $e'$, between the upper edges of the double walls of the cone E, is secured a ring-pipe, F, into which the pipe D discharges the vapor, and from which the vapor passes, through holes in the under side of said ring-pipe, into the space or chamber $e'$, in which it is condensed, and from which it passes off through the pipe G.

The interior cavity of the cone E is filled with a freezing-mixture, such, for instance, as salt and ice, by means of which the heat is withdrawn from the vapor in the space $e'$, condensing it. The freezing-mixture should be covered with a layer of sawdust, or other suitable non-conducting substance, to prevent the heat being taken from the air through the top of the condenser, instead of being taken from the vapor to be condensed.

As the freezing-mixture melts, it may be drawn off through the pipe H; a screen, I, being placed upon the inner orifice of said pipe, to prevent the escape of the sawdust through said pipe H.

Through the closed top of the condenser is formed a man-hole, closed by a man-hole plate, J, so that the freezing-mixture may be conveniently introduced, and so that the sawdust may be conveniently removed when required.

When the apparatus is in use, the man-hole plate J may be secured in place by a paraffine-wax seal, or by other convenient means.

If desired, the condenser may be placed in a water-tank, through which a stream of cold water may be allowed to flow, so that the stratum of vapor may be exposed to a cold surface upon both sides.

Having thus described my invention,

What I claim as new, and desire to secure by Letters Patent, is—

1. The combination of the tank A, copper cone B, and double-walled cone C, with each other, substantially as herein shown and described, and for the purpose set forth.

2. The combination of the ring-pipe F, having holes in its lower side, and double-walled inverted cone E, having a closed top, provided with a man-hole and man-hole plate, J, with each other, whether used with or without a surrounding water-tank, substantially as herein shown and described, and for the purpose set forth.

3. The combination of the tank A, copper cone B, double-walled cone C, pipe D, ring-pipe F, having holes in its lower side, and inverted double-walled cone E with each other, substantially as herein shown and described, and for the purpose set forth.

4. An arrangement of mechanism, by means of which the substance to be distilled, and the vapor to be condensed, either or both, are operated upon when extended in thin sheets or strata, substantially as herein shown and described, and for the purpose set forth.

C. M. JAMES.

Witnesses:
ALEX. F. ROBERTS,
JAMES T. GRAHAM.